United States Patent [19]

DeFino et al.

[11] Patent Number: 5,079,538
[45] Date of Patent: Jan. 7, 1992

[54] AUTOMOBILE INTRUDER ALARM SYSTEM

[75] Inventors: John M. DeFino, Roanoke; Neal G. Shields, Forth Worth, both of Tex.

[73] Assignee: Specific Cruise Systems, Inc., Fort Worth, Tex.

[21] Appl. No.: 360,128

[22] Filed: Jun. 1, 1989

Related U.S. Application Data

[62] Division of Ser. No. 42,375, Apr. 24, 1987, Pat. No. 4,866,417.

[51] Int. Cl.$^5$ .............................................. B60R 25/10
[52] U.S. Cl. ...................... 340/426; 340/429; 307/10.2
[58] Field of Search .................. 340/426, 428, 429; 307/10.2; 455/345, 346

[56] References Cited

U.S. PATENT DOCUMENTS 3,812,484  5/1974  Miller et al.
3,947,815  3/1976  Muncheryan
4,205,300  5/1980  Ho et al.
4,383,242  5/1983  Sassover et al. ................ 340/429 X
4,414,541  11/1983  Ho ........................................ 340/566

OTHER PUBLICATIONS

Consumer Reports, "Auto Alarm Systems", Oct. 1986, pp. 658–662.

Primary Examiner—Jin F. Ng
Assistant Examiner—Jeffery H. Hofsass
Attorney, Agent, or Firm—Melvin A. Hunn

[57] ABSTRACT

An improved vehicle intruder alarm system includes a method of automatically arming an alarm system. When arming the alarm system by remote control the vehicle windows can be raised and the vehicle headlights automatically turned on by remote control. When entering a vechicle door while the system is armed, a low warning tone is produced for an entry delay time. The warning tone increases with time. The processor for the alarm senses the magnitude and rate of impacts or motions of the vehicle. Short warnings are produced when the magnitude and rate are above a threshold.

3 Claims, 8 Drawing Sheets

AUTOMOBILE INTRUDER ALARM SYSTEM

This application is a division of application Ser. No. 042,375 filed Apr. 24, 1987, now U.S. Pat. No. 4,866,417.

BACKGROUND OF THE INVENTION

1. Field of the Invention

This invention relates generally to automobile intruder alarm systems, and specifically to microprocessor based automobile intruder alarm systems.

2. Description of the Prior Art

With automobile thefts on the rise in many parts of the nation, vehicle theft protection devices and systems have increased in popularity. Often, however, existing systems fail to meet the standards of high protection and user convenience.

Some prior art systems use a remote control transmitter to arm and disarm the alarm. The transmitter is carried by the individual. While operable, the full potential of a remote transmitter is not being fully utilized and there are some problems.

One problem is that the prior art remote systems arm only when the doors are closed. Many alarm systems are connected to the interior or dome light as a means to sense when the door is closed. When the light is on, the system regards the door as open. This causes problems with vehicles which have delayed dome lights. The delayed dome light may remain on for about 30 seconds after the driver has left the vehicle. If so, the alarm system regards the door as still open for the 30 seconds. Consequently, the remote transmitter cannot arm the alarm system until the interior light has turned off.

Another problem with remote arming systems is that vibrations caused by the closing automobile door can often be detected by the motion and glass breakage detectors for a tiny time interval after the door is closed. If the operator arms the alarm system during this interval, the alarm system will not only be armed, but will erroneously conclude that a thief or vandal is tampering with the vehicle and accordingly sound the alarm.

Yet another problem often arises with remote controlled alarm systems. Remotely controlled alarm systems often have receiver units located within the passenger compartment of the vehicle. These receiver units are often affected by the sounding alarm. More precisely, while the alarm siren is sounding, the receiver can go out of regulation and thus either be totally unresponsive to the coded signal transmitted by the handheld receiver, or be unresponsive to the coded signal except at very short distances, often to distances that are within the confines of the vehicle.

If the operator inadvertently sets off the alarm siren, he may have to endure a full alarm sequence (often several minutes long) before he can disarm the alarm system through the use of the remote control transmitter. This several minute long vigil can result in embarrassment and undesired public attention, perhaps from a police officer.

Another problem occurs if the vehicle operator returns to his vehicle and forgets that the alarm system has been armed. When he is reminded by the sounding alarm, he can experience a sudden fright. This is annoying to the operator. Such a false sounding of the alarm is also annoying to those residing nearby. Moreover, false alarms degrade the protective value of alarm systems because the public in general is desensitized by false alarms. One prior art system employs a beeping tone upon entry of the vehicle, but this doesn't inform the driver how much time is left to disarm the system.

Alarm systems can be equipped with motion detectors. However, many of these systems respond to slight impacts with a full alarm sequence. Such impacts can be a bump from the opening door of an adjoining vehicle in a parking lot, or the bump from a vehicle attempting to parallel park in an adjoining space. Clearly, it is inappropriate to respond to such motions with a full alarm. Desensitizing the detector, however, might result in the failure of the alarm to activate when an actual theft or intrusion is taking place.

Prior art alarm systems have sirens that emit sounds with a uniform decibel level, or amplitude, but with a duration that depends upon the particular task being performed by the alarm system. Short, loud bursts, while capable of conveying information to the operator, are irritating to the operator, and bothersome to those within earshot.

Often, the operator wishes to leave his vehicle in the custody of another, such as an auto mechanic or parking lot attendant. Usually, the operator does not wish to reveal the intricacies of his alarm system to a stranger. Accordingly, prior art alarm systems have a "valet" switch which suspends the alarm system.

These valet systems have several shortcomings. First, when the valet is engaged, the vehicle indicator ceases flashing. This flashing indicator is often a light emitting diode which has a great deterrent effect. Thus, the unattended auto becomes an easy target for experienced thieves. Second, prior art valet switches will give the operator no indication that the alarm is suspended. A forgetful operator might thus suspend the alarm system for longer than desired, inadvertently exposing the vehicle to unnecessary risk.

Prior art remote activated alarm systems often have a bypass switch. These switches are secreted or otherwise cleverly concealed. They are designed to allow the operator to override the starter interrupt. The starter interrupt will disable the vehicle ignition system while and after the alarm is activated. Bypass switches are useful if the operator has misplaced his remote control transmitter or similar device used to disarm the alarm system. However, their utility is overshadowed by the security risks they pose. A clever and experienced car thief will often be able to locate the hidden bypass switch with ease.

SUMMARY OF THE INVENTION

The present invention is an alarm system that is composed of a plurality of methods. One embodiment of the system provides a method of arming the alarm system by remote control with a handheld transmitter, and a receiver located within the vehicle. Once the alarm system is armed, the transmitter can be used to roll up the vehicle windows, and turn on the vehicle headlights.

A pre-arm feature enables immediate remote arming with a transmitter even though the vehicle has a delayed dome light, and even though the system senses door closure by monitoring the dome light. The processor, when receiving a signal with the dome light still on, will provide an audible chirp of a lower tone than the normal chirp provided when the system is armed. Then when the interior light goes off, the system will fully arm automatically.

A method of preventing false alarms from motion sensors and glass break detectors caused by the vibrations of a vehicle door slammed immediately prior to remote control arming is provided.

A method is provided for allowing a tiny time interval of silence during the sounding of the alarm siren. This allows the receiver an interval during which signals may be received more easily.

Two methods for responding to an entry through a vehicle door are provided. One method uses a two-tone sound with escalating volume during an entrance delay time to warn the operator that the alarm is armed. The other method uses a ticking sound that increases in rate as the entrance delay time comes to a close.

A method for disarming the alarm system by remote control is provided. In addition, the vehicle trunk can be opened by remote control after the disarming.

A method of detecting motions affecting the vehicle, and providing different responses depending upon the magnitude and rate of such motions is provided.

A method of engaging the alarm siren is provided in which both the amplitude and duration of the siren tone are used to impart information to the operator.

A valet switch is provided that allows the operator to suspend the alarm system, but reminds the operator that the valet mode has suspended the alarm system protection, and provides a signal within the vehicle leading would-be thieves to believe that the alarm system has been armed.

A bypass switch is provided that allows the operator to override the alarm system starter interrupt feature. However, this bypass does not leave the vehicle exposed to risks associated with true bypass switches. Engaging the bypass switch does not completely override the alarm system, but rather substitutes one mode of alarm protection for another mode of protection. Thus, the vehicle starter interrupt can only be bypassed if the would-be operator has a vehicle ignition key. Of course, an intruder usually does not have the vehicle key, so he can not avail himself of the bypass switch.

The above as well as additional objects, features, and advantages of the invention will become apparent in the following detailed description.

DESCRIPTION OF THE PREFERRED EMBODIMENT

Figure 1:
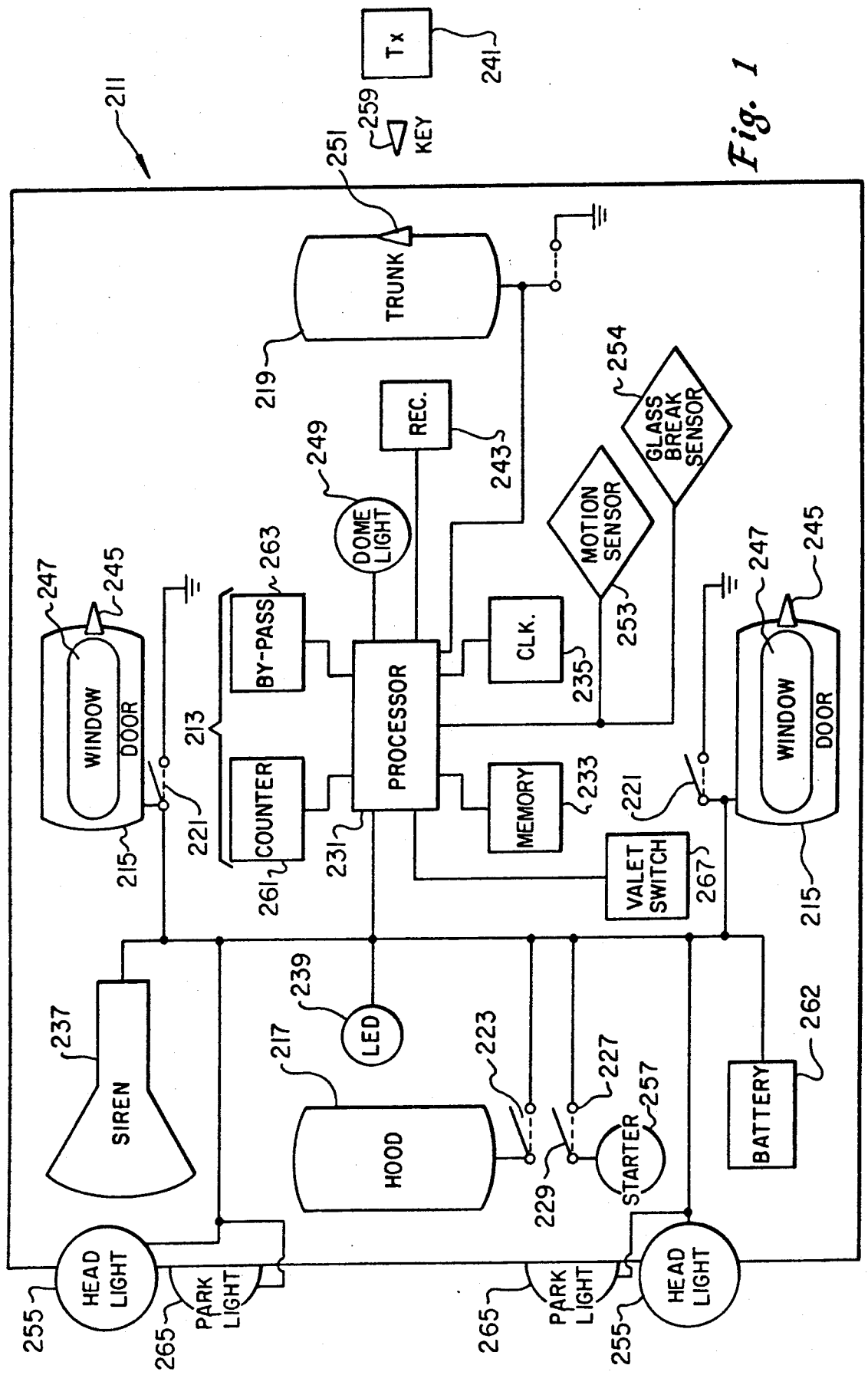
FIG. 1 depicts the various components provided for in this invention in schematic and block diagram form.

In this invention, a vehicle 211 is equipped with a vehicle theft and burglary alarm system 213. The vehicle is of the type having multiple doors 215. In addition, the vehicle may have a hood 217 and a trunk 219. The various vehicle doors 215 are equipped with door sensors 221. The door sensors 221 will normally be the conventional switches used to turn on the interior or dome light 249 when the door is open. The hood 217 and trunk 219 may also be equipped with a hood sensor 223 and a trunk sensor 225.

The vehicle is of the type having an ignition switch 227 which is operated by an ignition key 229. Installed within the vehicle 211 are a processor 231 and processor memory 233. A clock 235 allows the processor 231 to perform calculations and provide responses after pre-programmed time delays. The processor 231 can also function as a counter 263. Battery 262 provides power to the alarm system 213.

The processor 231 communicates with an alarm siren 237 and a blinking LED indicator 239. It is through the alarm siren 237 and the blinking LED indicator 239 that the processor 231 communicates with the operator and would be intruders.

In one embodiment, the operator is provided a transmitter 241, small enough to be held in the operator's hand and stored in the operator's pocket. This transmitter 241 provides a coded radio frequency signal. Mounted within the vehicle 211 and communicating with the processor 231 resides a receiver 243. This receiver 243 is capable of detecting the frequency ranges emitted by the transmitter 241. It is through the use of the transmitter 241 and receiver 243 pair that the operator can arm the alarm system 231 by remote control, and later disarm the alarm system 213 and gain access to his vehicle 211.

The vehicle 211 can be of the type that has electric door locks 245 and electric windows 247. The electric door locks 245 of the vehicle 211 will lock automatically when the alarm system 213 is armed by remote control. The electric windows 247 of the vehicle 211 can be raised by remote control through the use of the transmitter 241 and receiver 243 pair. Moreover, vehicle interior lights 249, parking lights 265, and a trunk open solenoid 251, which controls access to the trunk 219, can be controlled by the alarm system 213.

The vehicle 211 has a valet switch 267 that suspends the alarm system 213, and a bypass switch 263 that overrides the starter interrupt feature of the alarm system 213 (described below).

Finally, the vehicle 211 is equipped with a motion sensor 253 which allows the processor 231 to monitor all impacts or motions detected while the vehicle 211 is left unattended. The alarm system may also be equipped with a glass breakage detector 254. Moreover, the processor 231 can be programmed to respond to the magnitude and frequency of the detected motions. The processor 231 can then activate some combination of the alarm siren 237 and vehicle head lights 255 to "warn away" the prospective intruder or vandal.

Figure 2:
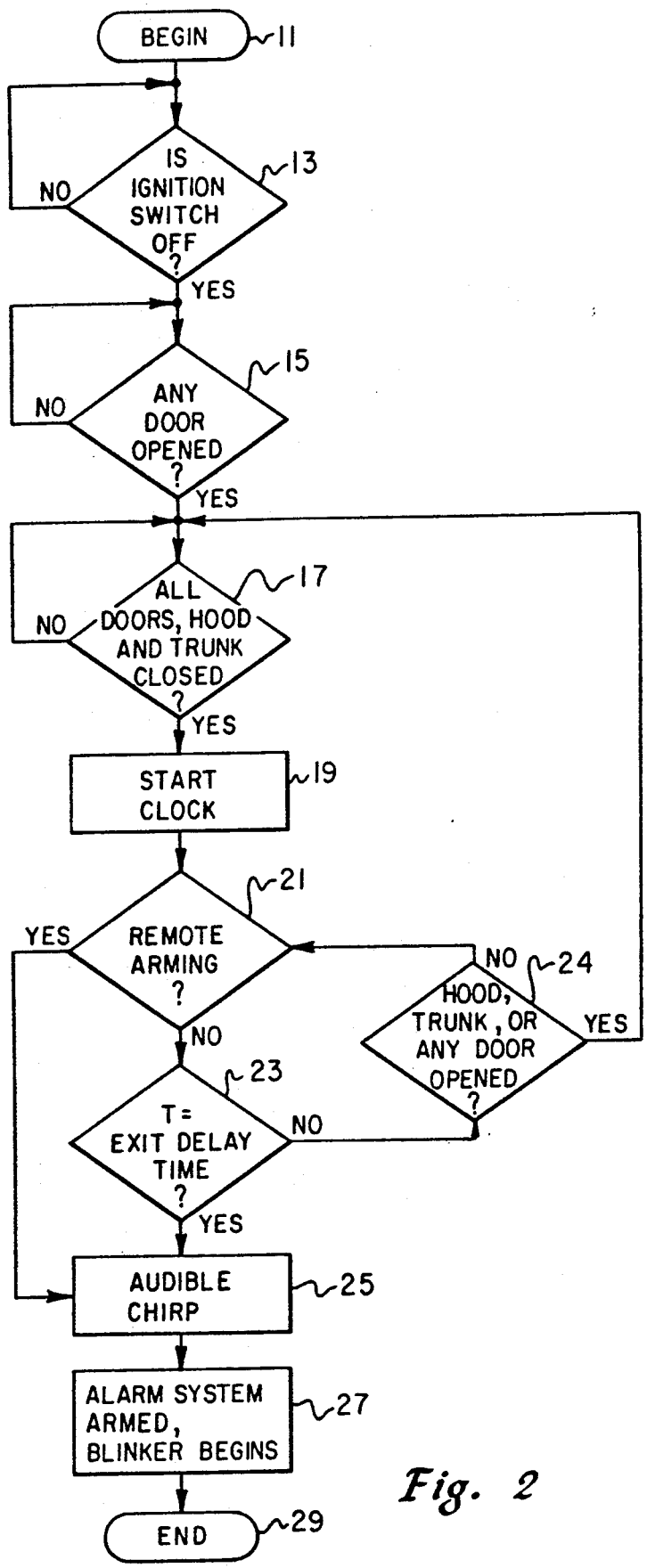
FIG. 2 depicts in flow chart form the method of automatically arming the intruder alarm system.

Turning now to FIG. 2, the various method steps that constitute an automatic or passive arming of the alarm system are described. At step 11, the method of automatically arming the alarm system 213 begins. Typically, the vehicle 211 has just been driven and parked by the operator to be left unattended for some period of time. The processor 231 detects when the ignition switch 227 has been turned to the off position by ignition key 229 in step 13.

Next, the processor 231 senses for the opening of any vehicle doors 215, through door sensors 221 in step 15. In step 17, the processor 231 determines when all vehicle doors 215, the vehicle hood 217, and the vehicle trunk 219 are closed. When all are closed, the clock 235 will begin, as illustrated in step 19. Unless a door 215 is opened after the ignition switch 227 is turned off, the clock 235 will not begin.

The processor 231 has been programmed to provide an exit delay time. During this exit delay time, the operator may arm the alarm system 213 by remote control transmissions from the transmitter 241. This option is depicted in step 21. Should the operator chose not to arm the alarm system 213 by remote control, then the processor 231 will pause for the exit delay time, as illustrated in step 23.

If during the exit delay time interval any vehicle door 215, hood 217, or trunk 219 is opened, then the alarm system will reset itself to step 17, and the processor will again sense for the closing of all vehicle doors 215, trunk 219, and hood 217. Step 24 illustrates this method step. This feature allows the operator to exit the vehicle and thereafter open the trunk 219, or hood 217, yet still avail himself of the convenience of passive arming. Moreover, this step also allows passengers ample time to exit toward the close of the exit delay time interval. Finally, the operator or passenger may reenter the vehicle 211 within the first exit delay time interval confident that a new exit delay time interval will be provided automatically.

Once the exit delay time has expired, then the alarm system 213 will automatically or passively arm. Such automatic arming will be accompanied by an audible chirp, or short tone, as shown in step 25. Simultaneous with the arming of the alarm system 213, an indicator 239, such as a light emitting diode, begins flashing. The arming of the alarm system 213 is illustrated in step 27. Once the arming is accomplished, the operator can leave his vehicle 211 unattended confident that the alarm system 213 will provide some protection against theft.

Figure 3:
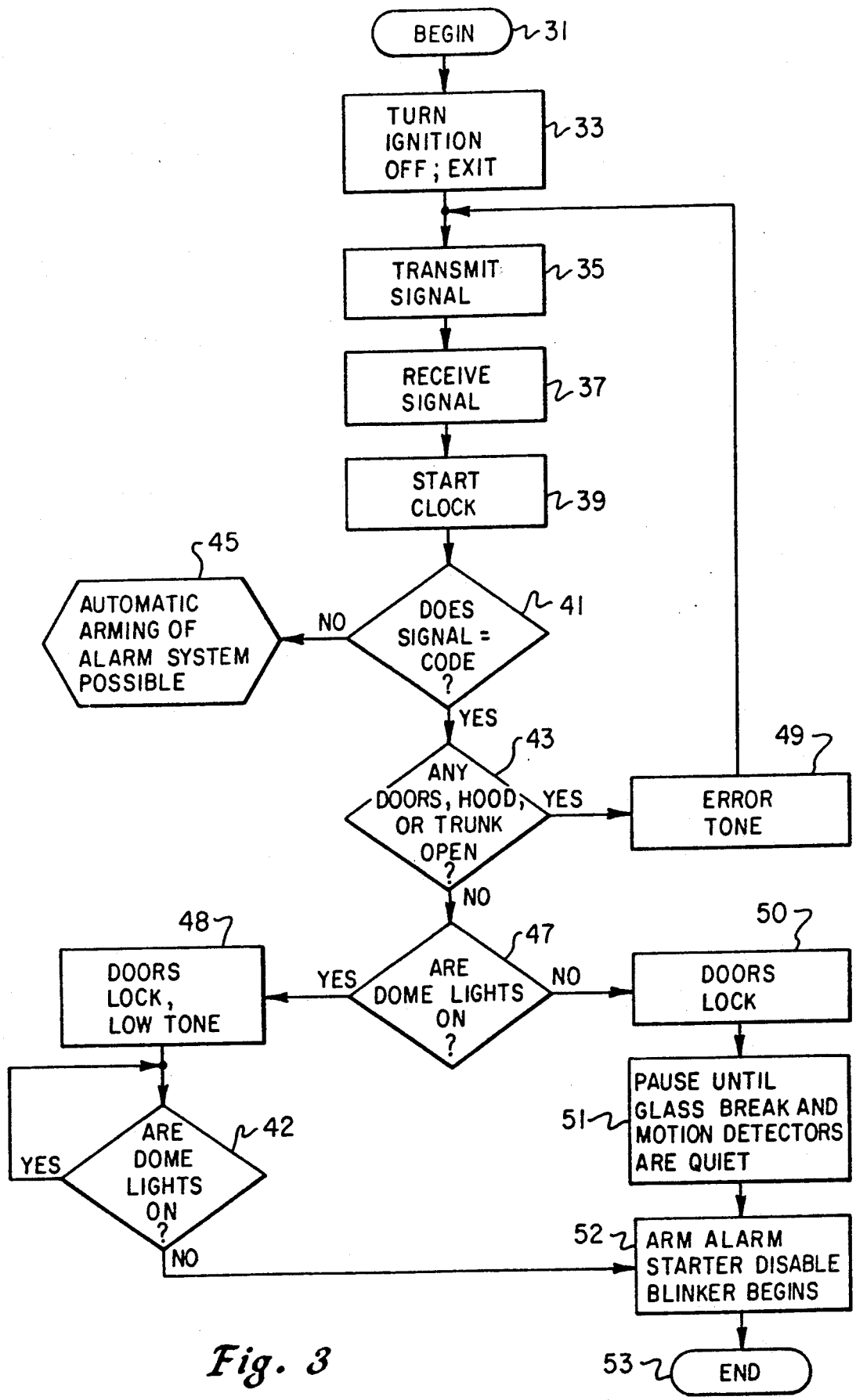
FIG. 3 depicts in flow chart form the method of arming the intruder alarm system by remote control.

FIG. 3 will now be used to illustrate the remote control arming of the alarm system 213. This remote control arming feature is a user option that must be performed within the preprogrammed exit time delay, as explained above in the description of FIG. 2. Step 31 illustrates the beginning point, in which the operator has parked the vehicle 211 and intends to leave it unattended for some period of time. The operator turns the ignition key 229 in the ignition switch 227 so that the ignition switch 227 is in its off position; the operator then exits the vehicle. Step 33 illustrates this operation.

From outside the vehicle 211, the user then transmits a signal with his handheld transmitter 241, as illustrated in step 35. In step 37, the signal is received by the receiver 243, which is located within the vehicle 211. Immediately, the clock 235 is started as depicted in step 39.

Next in step 41, the processor 231 compares the signal received with a preprogrammed code. If the signal is identical to the code, the processor 231 proceeds with the arming. However, if the signal is not identical to the code, an automatic arming of the alarm system 213 is possible. Such automatic arming is depicted in step 45, and was discussed above in connection with FIG. 2.

Assuming that the signal is identical to the code, in step 43 the processor 231 determines if any doors 215, the hood 217, or the trunk 219 are open. If so, the processor 231 provides an audible error signal, as illustrated in step 49.

At step 43 the processor 231 determines if the dome lights 249 are on or off. Some alarm installers will connect the door sensing line to the vehicle dome light 249 to determine when all vehicle doors 215 are closed. In many vehicles, the dome lights 249 will immediately turn off when all of the doors 215 are closed.

A number of vehicle models, however, have dome lights 249 that remain on for about 30 seconds after all vehicle doors 215 are closed. If the alarm system is connected to the door sensors 221 rather than the dome lights 249, this presents no problem because the processor 231 will sense the closing of the door switches or sensors 221, not the actual turning off of the dome light 249.

However, if the alarm system 213 is connected directly to the dome light 249 and a dome light delay exists, the processor 231 will consider the doors 215 open until the power to the dome light 249 goes off. This would prevent the user from remotely arming the alarm system with the transmitter 241 until the dome light 249 goes off.

To prevent this inconvenience, at step 42 the processor 231 will pause until the dome light 249 goes off before proceeding. However, at step 48, a single audible chirp will be produced to inform the operator that the alarm system 213 has prearmed and will indeed arm when the dome lights 249 go out. This chirp is a lower tone than the chirp produced when the system fully arms. At step 48, the vehicle doors will also lock. This pre-arming allows the operator to use remote arming even if the door sensing line is connected directly to the dome light 249.

Note that step 43, in which the processor 231 determines if any vehicle doors 215 are open, is dependent upon the actual use of door sensors 221. If the alarm system installer connected the door sensor line directly to the dome light 249, then at step 43 only an open hood 217 or trunk 219 will produce an error signal at step 49. If no dome light delay exists or if actual door sensors 221 are used, the vehicle doors will lock as demonstrated by step 47.

Step 51 provides that the alarm system 213 pause until no vibration is detected by the glass break detector 254 and no motion is sensed by the motion sensor 253. This feature is provided because vibrations and motion produced by the closing of a vehicle door 215 are present and detected by the sensors for a brief interval after the vehicle doors 215 are closed. If the operator arms the alarm system during this brief interval, the freshly armed alarm would erroneously conclude that a thief or vandal was tampering with the vehicle 211.

When the motions and vibrations subside in step 51 or when the dome light delay expires in step 42, the alarm system 213 is armed in step 52. Also, at this step, the indicator 239 begins flashing and the starter 257 is disabled.

At step 53, the operator is provided an option. He can either leave his vehicle 211 unattended, or he can continue with the method described in FIG. 4.

Figure 4:
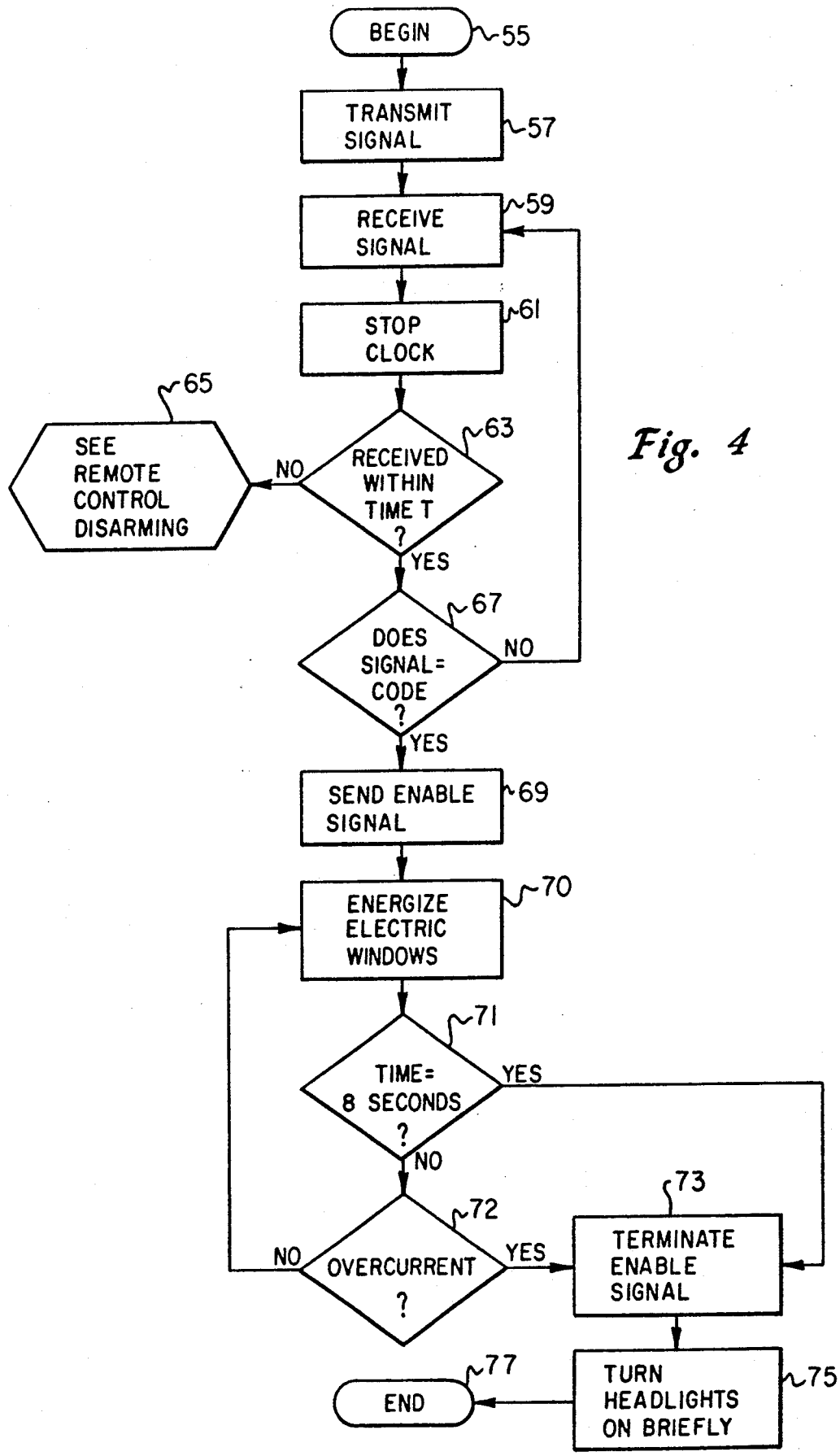
FIG. 4 depicts in flow chart form the method of rolling up the vehicle windows and turning on the vehicle headlights by remote control after the alarm system has been armed.

Turning now to FIG. 4, this user option will be explained. At step 55, the operator has just armed the alarm system 213 by use of the transmitter 241. If the vehicle windows 247 are down, the operator can raise them using the method illustrated by FIG. 4. If the windows 247 are already up, but the operator wishes to have the vehicle headlights 255 energized for a short interval, then the operator may proceed with the method described in FIG. 4.

In step 57, the operator transmits a second signal from the handheld transmitter 241, which is identical to the first signal transmitted in step 35 of FIG. 3. This signal is received by the receiver 243, as demonstrated in step 59. Upon the receipt of the signal, the clock that was started in step 39 of FIG. 3 is stopped, as shown by step 61.

In step 63, the processor 231 determines whether the second signal was received within a preprogrammed allowable time limit T. If not, step 65 demonstrates that the operator has erroneously disarmed the alarm system 213. Assuming the second signal was received within the allowable time limit, in step 67 the processor 231 determines if it is identical to the code. Next in step 69, the processor 231 sends an enable signal to electric windows 247 which energizes them for eight seconds as shown in steps 70, 71. The current provided to the electric windows 247 is monitored; when an overcurrent is detected in step 72, the enable signal is terminated in step 73. Finally in step 75, the vehicle headlights 255 are turned on briefly. This provides some security to the operator, as well as a lighted path. In step 77, the operator leaves the vehicle 211 unattended.

Figure 5:
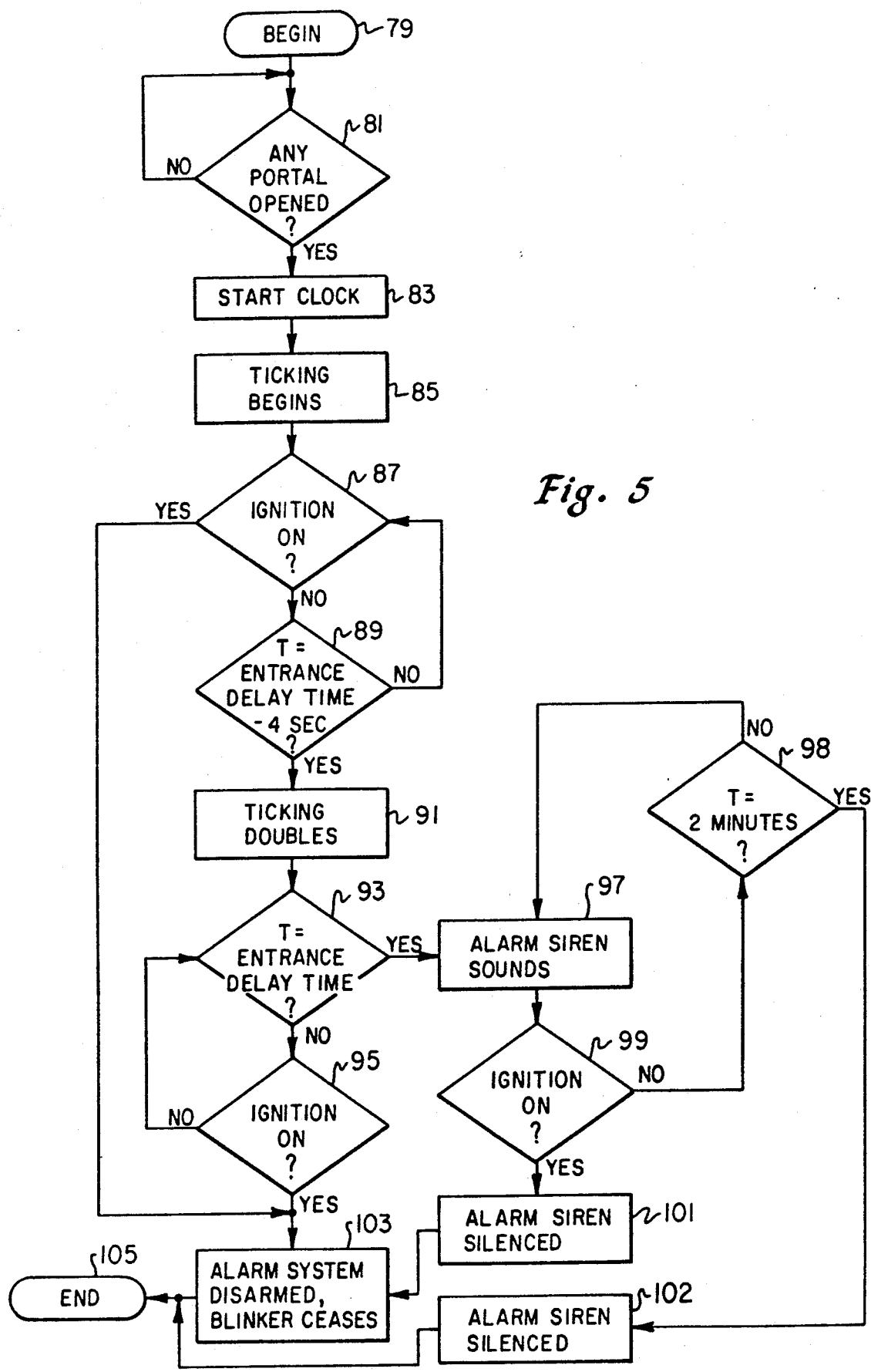
FIG. 5 depicts in flow chart form the method of responding to intrusion after the alarm system has been armed by automatic arming.

FIG. 5 illustrates the method of responding to an entry through any vehicle door 215 after the alarm system 213 has been armed according to the method described in FIG. 2. The method of FIG. 5 is used only with the passively armed system. It is not used with the alarm system described in connection with FIG. 3 that uses a transmitter 241 (FIG. 1). Beginning with step 79, the operator approaches the vehicle 211 which has been left unattended for some time. The processor 231 senses for the opening of any door 75 in step 81. Once a door 215 is opened, the clock is started in step 83.

Step 85 illustrates that a ticking sound begins upon entry. This is described as "ticking on entry", and is used to inform the operator that the alarm system 213 is armed, and will provide a full alarm sequence from alarm siren 237 if the alarm system 213 is not disarmed within a preprogrammed entrance delay time. The ticking on entry occurs only when a door of the vehicle is opened. In case of glass breakage or the opening of the hood or trunk, the full alarm from siren 237 immediately sounds. The ticking is generated by the speaker of siren 237, which receives pulses from the processor 231 of much lower magnitude than if the processor 231 signals the siren 237 for full alarm. The ticking sound is much lower in amplitude than the full alarm.

The alarm system 213 is disarmed, as shown in step 87, by the turning of the ignition key 229 in the ignition switch 227 so that the ignition switch 227 is in its on position. Step 89 demonstrates that as the time interval comes to a close, the ticking sound will accelerate in frequency, as step 91 provides. This accelerated ticking informs the operator that the entrance delay time interval is soon to expire.

At step 93, the processor 231 recognizes that the preprogrammed entrance delay time has expired. In this event, steps 97, 98 provides that the alarm siren 237 will sound a full alarm for two minutes. After the alarm siren 231 sounds for the full two minutes, it will be silenced in step 102; however, the alarm system 213 will remain armed. The alarm system 213 can only be disarmed by turning the ignition key 229 in the ignition switch 227 so that the ignition switch 227 is in its on position. This is demonstrated by steps 95 and 99.

Also, turning the ignition key 229 in the ignition switch 227 when the alarm siren 237 is sounding will silence the alarm siren 237 as illustrated in step 101, if it has been armed passively. In step 103, the alarm system 213 is disarmed, and the indicator 239 has ceased blinking. The operator is then free to start the car and drive away as in step 105.

The "ticking on entry" feature is a useful one; it provides the operator with a warning that the alarm system 213 is armed. As the ticking doubles in step 91, the operator is alerted to the fact that the preprogrammed time interval is coming to a close, and the disarming should be accomplished quickly to avoid the sounding of the alarm siren 237.

The processor 231 can be programmed to cause the alarm siren 237 to provide a unique sound at full alarm which is recognizable by the owner. At full alarm, the siren 237 will provide various multi-toned alarm sounds. Spaced between these multi-toned alarm sounds are a series of with repetitive monotones, each of a short duration. The number of the repetitive monotones during each interval is programmed into the processor 231 by the installer of the alarm. One alarm may be programmed to provide three monotones between each series of multi-tones, while another may have only two. This number of repetitive monotones is recognized by the owner, enabling an owner within hearing distance to take steps to prevent the intrusion. With a common sounding alarm that sounds like alarms on other vehicles, an owner whose vehicle is parked in a parking lot likely will regard the alarm as originating from someone else's vehicle.

Figure 6:
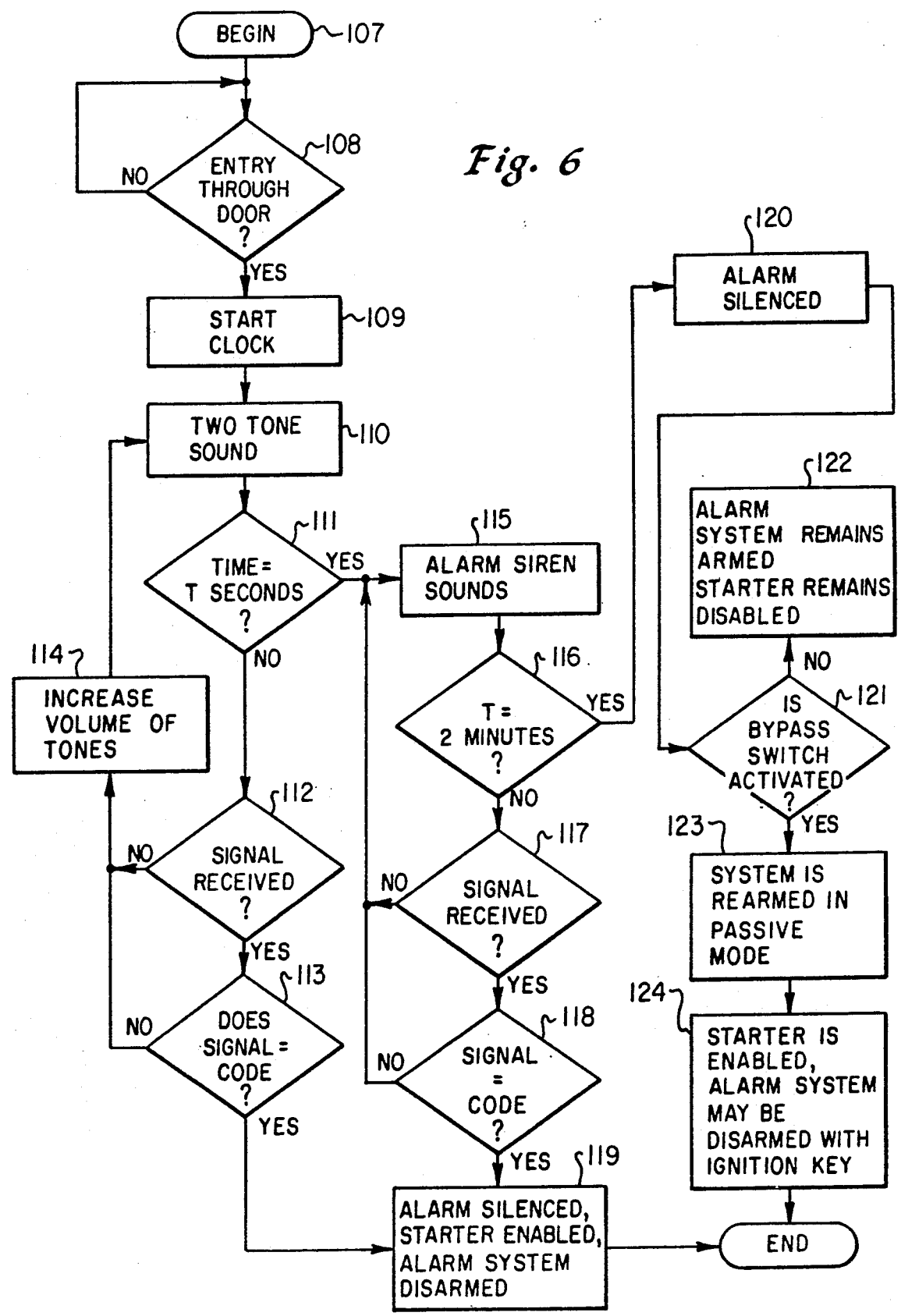
FIG. 6 depicts in flow chart form the method of responding to intrusion after the alarm system has been armed by remote control.

Turning now to FIG. 6, an alternate method of responding to entry of the vehicle 211 through a vehicle door 215 is described. This method will follow if the alarm system 213 has been armed according to the remote control arming sequence illustrated by FIG. 3. Concurrent with the remote arming of the alarm system 213 in FIG. 3, the starter 257 was disabled.

In the beginning step 107, the alarm system 213 is armed, according to the method of FIG. 3. The processor 231 determines if entry has been made through any of the vehicle doors 215 in step 108. In step 109, the clock 235 is started. At entry, a two-toned alarm sequence is initiated at a rather low volume level. This is illustrated in step 110. As the clock 235 advances through a preprogrammed time interval, the volume of the alarm siren 237 increases. The preprogrammed time interval T is compared to the clock 235 in step 111.

If the programmed time interval has expired, the alarm siren sounds at full volume as per step 115. If the time interval has not expired, the processor 231 determines, in step 112, if a signal has been received. If so, the signal is compared to the code stored in processor memory at step 113. If no signal is received, or if the signal that is received is not identical to the code, then the volume of the tones initiated in step 110 are increased in step 114.

If, however, the signal is identical to the code stored in processor memory, the siren 237 will be silenced, the alarm system 213 will be disarmed, and the starter 257 will be enabled. This is demonstrated in step 119.

Supposing no signal is transmitted, and the alarm siren 237 begins sounding as illustrated by step 115, the time will again be checked by processor 231 at step 116. The alarm siren 237 is allowed to sound for only two minutes, and is silenced in step 120 once this time interval expires. This prevents the discharge of the vehicle battery 262.

In steps 117 and 118, the processor 231 determines if any signal has been received, and if so, whether the signal is identical to the code stored in processor memory 233. If no signal is received, or if the signal received differs from the code stored in processor memory 233, the alarm siren 237 continues sounding as per step 115. However, if the signal is identical to the code, the alarm siren 237 is silenced, the alarm system 213 is disarmed, and the starter 257 is enabled as demonstrated by step 119.

Supposing the alarm siren 237 has sounded for the full two minute interval, and the alarm siren has been silenced as per step 120, the processor then determines if the bypass switch 263 has been activated in step 121. If not, the alarm system 213 remains armed and the vehicle starter 257 remains disabled as illustrated in step 122. If, however, the bypass switch 263 has been activated, the alarm system 213 will automatically rearm itself as if the arming had occurred passively. The passive arming is the method depicted in FIG. 2.

The passively armed alarm system 213 possesses two characteristics that distinguish it from the remote control arming. First, the passively armed system may be disarmed with the vehicle key, while the remotely armed system may only be disarmed with the remote control transmitter 241. Second, the remotely armed system automatically disables the starter 257. The passive arming does not disable the starter 257.

The rearming that occurs in step 123 if the bypass switch 263 has been activated will allow an operator who has a lost or broken transmitter 241 to use the bypass switch 263 and the ignition key 229 to start the vehicle 211. When opening the door with the key, the alarm will sound for the full two minutes, and during this time the operator should enter the vehicle and actuate the bypass switch 263. Then, once the alarm stops the system will arm passively. The operator can then use the key 229 to disarm the alarm and start the vehicle.

Without the bypass switch 263, the operator would be unable to start his vehicle 211 at any time if he had initially armed it with the remote transmitter 241. Even after the alarm ceases after the two minute interval, the starter interrupt remains unless the bypass switch 263 is actuated. However, this bypass switch 263 is not a true bypass switch since the vehicle ignition key 229 is required to disarm the reset alarm system 213. This assures that a thief will not be able to bypass the starter interrupt feature without possession of the ignition key 229, increasing vehicle security.

Figure 7:
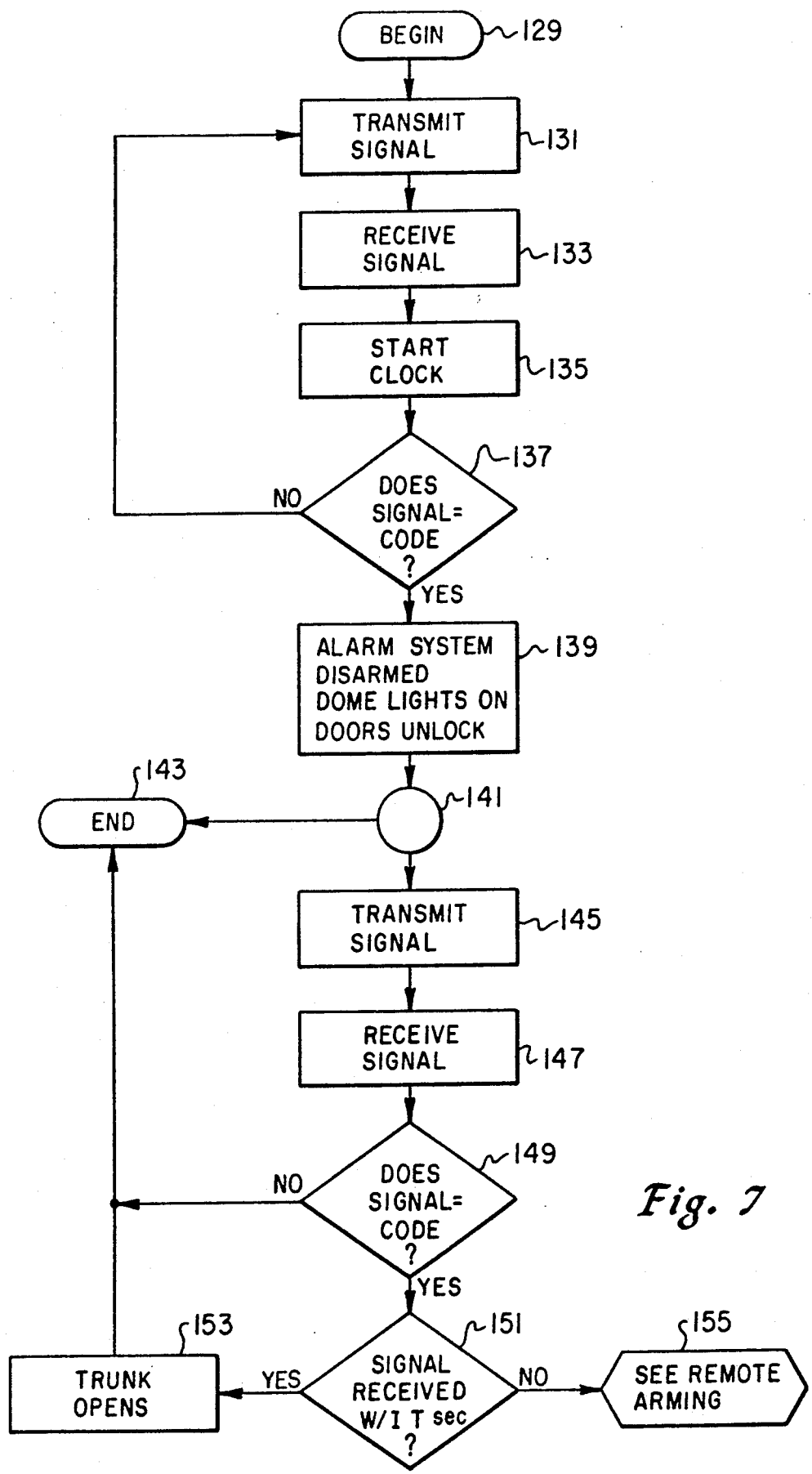
FIG. 7 depicts in flow chart form the method of disarming the alarm system by remote control.

FIG. 7 illustrates a method of remotely disarming the alarm system 213 by use of the transmitter 241. At the beginning step 129, the alarm system 213 is armed. As the operator approaches the vehicle 211, he transmits a signal as per step 131 with his transmitter 241. This signal is received by the receiver 243, which is located in the vehicle 211. The reception of the signal in step 133 activates the clock 235 in step 135.

In step 137, the processor 231 compares the transmitted signal to a preprogrammed code in processor memory 233. If the signal is identical to the code, the alarm system 213 is disarmed, the interior lights 249 of the vehicle 211 are turned on for ten seconds, and the doors 215 are unlocked as shown in step 139.

At step 141, the operator is provided an option. He can either enter the car and drive away as per step 143, or he can transmit a second signal as per step 145. A second transmission of the coded signal from transmitter 241, if accomplished within a short time interval from the first transmission, will open the vehicle trunk 219. This is an attractive feature if the operator has his arms full, and desires to place objects in the trunk 219.

The transmitted signal is received in step 147 by the receiver 243. The processor 231 compares the transmitted signal to the code stored in processor memory 233 in step 149. If the signal is identical to the code, and is received within the preprogrammed allowable time interval, as determined in step 151, then the trunk open solenoid 251 located in the vehicle trunk 219 will open the trunk as per step 153. The operator can then put his packages or luggage in the trunk 219, without having to fumble for his trunk key 259. Thereafter, the operator may drive away as per step 143.

If the operator accidently set off the alarm by failing to use his transmitter 241 to disarm, unless provisions were made, the transmitter 241 might be unable to disarm the system while the siren 237 is sounding. If the alarm siren 237 is sounding, the receiver 243 may go out of regulation and thus be unresponsive to the transmitter 241, or only responsive to transmissions made from within the vehicle 211. In order to avoid this inconvenience, a method is provided wherein the processor 231 periodically interrupts the sounding alarmm siren 237 for a tiny time interval. This provides a "quiet zone" during which the receiver 243 is responsive to transmissions from the transmitter 242. This method is not depicted in flow chart form. In the preferred embodiment, this quiet zone is a 300 millisecond interval created at random approximately every three seconds throughout the entire two minute long alarm sequence.

Figure 8:
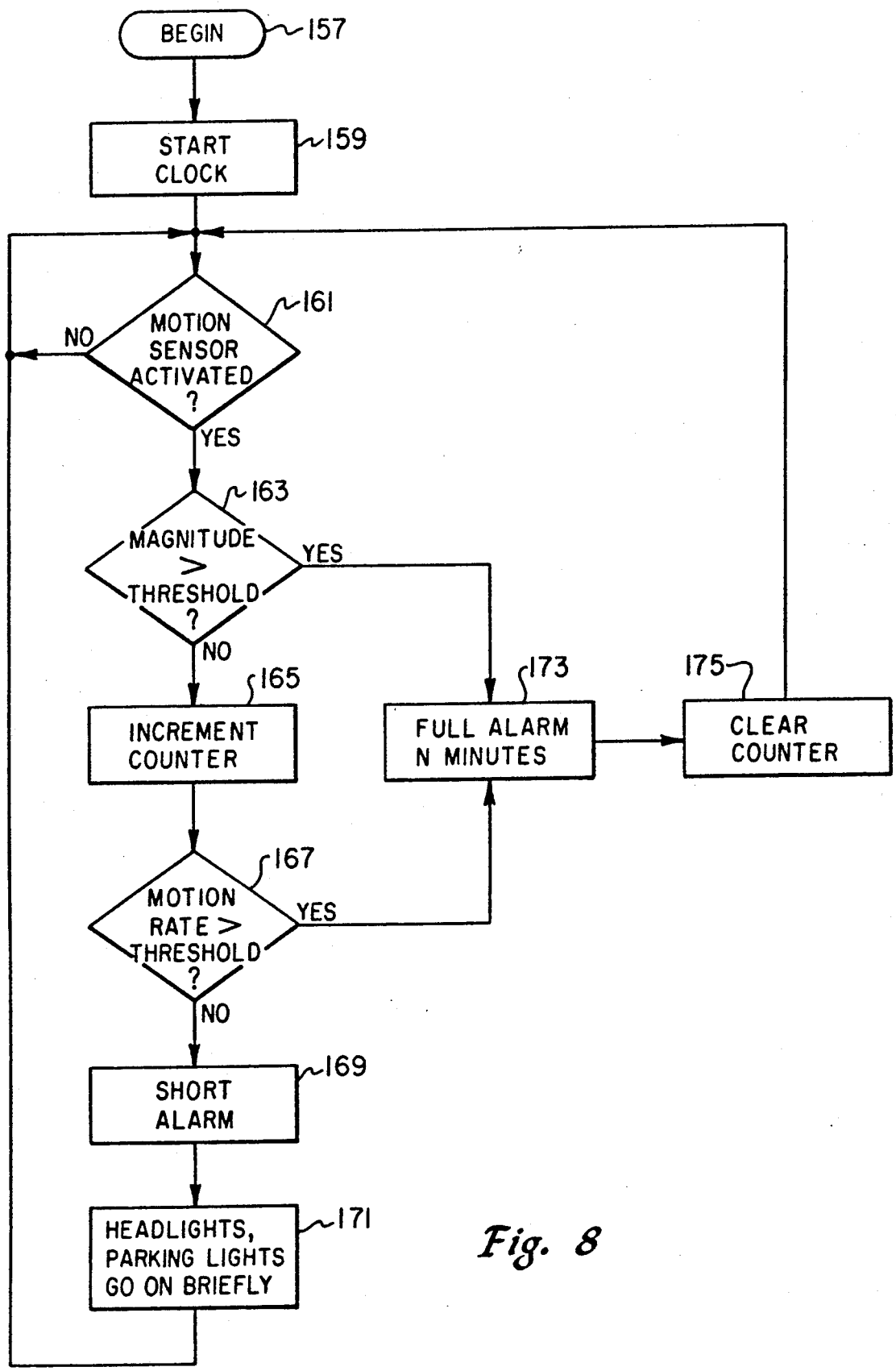
FIG. 8 depicts in flow chart form the method of protecting a vehicle and providing an alarm signal when motions or impacts affect the vehicle.

FIG. 8 illustrates yet another useful and unique alarm method. At beginning step 157, the vehicle 211 has been left unattended, with the alarm system 213 armed. All the while, clock 235 provides the processor 231 with time readings. The vehicle 211 has been equipped with a motion sensor 253. In step 161, this motion sensor is activated by some type of impact or movement imparted to the vehicle. At step 163, the magnitude of the motion is analyzed by the processor 231.

If the magnitude of the motion exceeds a preprogrammed threshold, then the processor 231 activates the alarm siren 237 in step 173. If the magnitude of the motion is below the preprogrammed threshold, then a counter 261 is incremented in step 165. The processor 231 uses data supplied by the clock 235 and the counter 261 to calculate a motion rate in step 167. The counter 261 counts how many of the below threshold movements are detected within a selected time period. If the calculated motion rate exceeds a preprogrammed threshold rate stored in processor memory 233, then an alarm sequence of step 173 is initiated.

If, however, the motion rate is less than the threshold motion rate stored in processor memory 233, then a short alarm sequence of step 169 is initiated. In addition, the headlights 255 and parking lights 265 will go on briefly as shown in step 171. After each alarm sequence of alarm step 173, the counter 261 is cleared in step 175. The short alarm sequence of step 169 would cause the siren 237 to sound only for a small increment of time, no more than a few seconds.

This "warn away" feature is a very useful one. The motion sensor 253 is sensitive to impacts, jacking of the vehicle, and towing of the vehicle. It will also warn of vandalism to the vehicle, as well as parking lot impacts from doors or bumpers of other vehicles.

This feature is further enhanced in that the processor memory 233 stores data concerning the frequency and magnitude of the motions affecting the vehicle. This data is reported to the operator upon his return by the indicator 239. This indicator flashes a distinctive pattern indicating a sequence of motion or impact events which occurred.

The motion detector described in FIG. 8 can be setoff by the vibrations produced when the operator unlocks the vehicle 211 and opens the door 215. This is an undesirable result, since it annoys or frightens the operator. In order to avoid this unnecessary and bothersome alarm, a method is provided wherein the processor is programmed to pause for a brief one second interval after each detected motion. During this interval, the processor 231 checks to see if a vehicle door 215 has been opened. If so, the motion detection method is suspended. If not, the motion detection method of FIG. 8 continues in its usual operation as described above.

Figure 9:
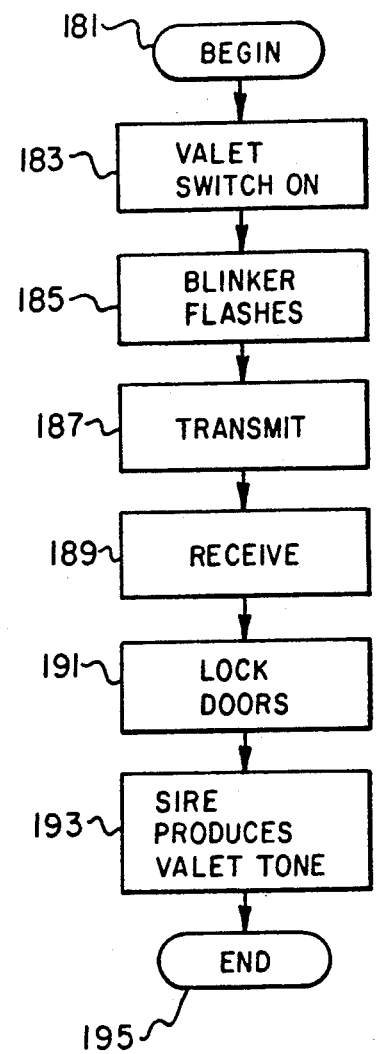
FIG. 9 depicts in flow chart form the method of using a valet switch to suspend the alarm system, while retaining some protection and convenience features of the alarm system.

A method of suspending the alarm system 213 is depicted in FIG. 9. At step 181, the operator wishes to leave his vehicle 211 in the custody of another, but does not care to instruct that person in the use of his alarm system 213. Accordingly, the operator switches on the valet switch 267 as illustrated in step 183. The indicator, or blinker, 239 will begin flashing. This indicator 239 serves as a deterrent to crime because the potential thief believes the alarm system 213 to be armed.

At step 187, the operator may still employ his transmitter 241 to lock the vehicle doors 215 by remote control. The signal is received at step 189, and the doors 215 are locked, if the vehicle is equipped with electric door locks 245.

Step 193 illustrates that the alarm system 213 provides a special tone to inform the operator that the valet switch 267 is on. At step 195, the operator may leave his vehicle in the custody of another confident that the alarm system 213 is indeed suspended.

The methods disclosed by FIGS. 2 through 9 contain several advantages. The important time periods, including exit and entrance delay time intervals, can be preprogrammed by the operator. Thus, the alarm system can be customized to suit the particular needs of the operator. Passive and remote control arming of the alarm system are coordinated; should the remote control arming fail, or should the operator forget to arm the system, it will automatically arm. An indication from remote arming is given even if the vehicle has a delayed dome light, with the door sensors connected thereto. After a remote control arming, the operator may roll up the vehicle windows by remote cotrol. Also, the vehicle headlights can be turned on by remote control. This can provide the operator with a lighted path in the dark.

Either a ticking sound with an increasing rate or a two-tone escalating tone reminds the operator, as he enters through a vehicle door, that the alarm is armed. Thus, the operator is not frightened by the alarm siren, the neighborhood is not disturbed by the siren noise, and false alarms avoided. The alarm system can be disarmed by remote control and the trunk can be opened by remote control. This is useful when the operator has his arms full with packages or luggage. The operator need not fumble for his keys to first disarm the alarm system, and the open his trunk.

A method of sensing motions affecting the vehicle and responding according to the magnitude and frequency of such motions is provided. This allows the alarm system to respond "intelligently" to motions, a feature that might unnerve a potential thief or vandal.

While the invention has been described in only two of its forms, it should be apparent to those skilled in the art that it is not so limited, but is susceptible to various changes without departing from the scope of the invention.

We claim:

1. The method of arming a vehicle alarm system by remote control, the alarm system being installed in a vehicle of the type having an ignition switch operated by an ignition key, and a starter, and wherein the vehicle is of the type also having electrically activated window closing mechanisms, the method comprising:

providing with the alarm system a handheld transmitter, and a receiver disposed within said vehicle, said receiver communicating with a processor with memory;

turning the ignition key in the vehicle ignition switch so that the ignition switch is in the off position; then transmitting a signal from outside the vehicle with the transmitter;

receiving the signal with the receiver;

comparing the signal with the processor to a preprogrammed code stored in the processor memory; then producing an error signal if any vehicle door, hood, or trunk is open when the signal is received;

arming the alarm system with the processor if all of the vehicle doors, hood, and trunk are closed; then disabling the vehicle starter;

transmitting a second signal, from the transmitter, that is identical to the first signal transmitted;

receiving the second signal with the receiver;

comparing the second signal to the code stored in the processor memory;

determining with the processor if the second signal is received within a preprogrammed allowable time interval that commenced with the sending of the first signal; then actuating the window closing mechanisms with the processor to close any open vehicle windows if the second signal was received within the allowable time interval, and if the second signal is identical to the code.

2. The method according to claim 1 wherein the vehicle is of the type also having headlights, the method further comprising:

turning the vehicle headlights on for a preprogrammed time interval with the processor if the second signal was received within said allowable time interval, and if the second signal is identical to the code.

3. A method of arming a vehicle alarm system by remote control, the alarm system being installed in a vehicle of the type having an ignition switch operated by an ignition key and electrically actuated window closing mechanisms, the method comprising in combination:

providing with the alarm system a handheld transmitter, and a receiver disposed within said vehicle, said receiver being coupled to a processor with memory for communicating with said processor with memory;

turning the ignition key in the vehicle ignition switch so that the ignition switch is in the off position; then transmitting a signal from outside the vehicle with the transmitter;

receiving the signal with the receiver;

comparing the signal with the processor to a preprogrammed code stored in the processor memory; then arming the alarm system with the processor;

transmitting a second signal from the transmitter that is identical to the first signal transmitted;

receiving the second signal with the receiver;

comparing the second signal to the code stored in the processor memory;

determining with the processor if the second signal is received within a preprogrammed allowable time interval that commenced with the sending of the first signal; then actuating the window closing mechanisms with the processor to close any open vehicle windows if the second signal was received within the allowable time interval, and if the second signal is identical to the code.

* * * * *